(12) United States Patent
Zara

(10) Patent No.: US 11,725,315 B2
(45) Date of Patent: Aug. 15, 2023

(54) METHOD FOR PRODUCING A FIBROUS MAT FOR THE ACOUSTIC AND/OR THERMAL INSULATION OF A COMPONENT OF A MOTOR VEHICLE

(71) Applicant: SO.LA.IS.—SOCIETA' LAVORAZIONE ISOLANTI—S.R.L. CON UNICO SOCIO, Refrontolo (IT)

(72) Inventor: Luigi Zara, Refrontolo (IT)

(73) Assignee: SO.LA.IS.—SOCIETA' LAVORAZIONE ISOLANTI—S.R.L. CON UNICO SOCIO, Refrontolo (IT)

( * ) Notice: Subject to any disclaimer, the term of this patent is extended or adjusted under 35 U.S.C. 154(b) by 961 days.

(21) Appl. No.: 16/084,667

(22) PCT Filed: Mar. 16, 2017

(86) PCT No.: PCT/IB2017/051545
§ 371 (c)(1),
(2) Date: Sep. 13, 2018

(87) PCT Pub. No.: WO2017/158556
PCT Pub. Date: Sep. 21, 2017

(65) Prior Publication Data
US 2019/0078244 A1 Mar. 14, 2019

(30) Foreign Application Priority Data
Mar. 16, 2016 (IT) .................. 102016000027681

(51) Int. Cl.
*D04H 1/76* (2012.01)
*D04H 3/002* (2012.01)
(Continued)

(52) U.S. Cl.
CPC .................. *D04H 1/76* (2013.01); *D04H 3/00* (2013.01); *D04H 3/002* (2013.01); *D04H 3/005* (2013.01);
(Continued)

(58) Field of Classification Search
CPC ............ D04H 3/07; D04H 3/005; D04H 3/00; D04H 3/018; D04H 3/077; D04H 3/002;
(Continued)

(56) References Cited

U.S. PATENT DOCUMENTS 3,625,809 A * 12/1971 Caroselli .................. F16G 1/04
428/222
6,155,379 A 12/2000 Nakagawa
(Continued)

FOREIGN PATENT DOCUMENTS

GB 191126612 A 2/1913
WO WO-2006095373 A1 * 9/2006 ............ D04H 3/004
WO WO 2009/010499 A1 1/2009

OTHER PUBLICATIONS

International Search Report and Written Opinion in International Application No. PCT/IB2017/051545, dated Jul. 27, 2017 (8 pages).

*Primary Examiner* — Elizabeth M Imani
(74) *Attorney, Agent, or Firm* — Nixon Peabody LLP

(57) ABSTRACT

Method for producing a fibrous mat, which can be installed in a component of a vehicle provided with an internal combustion engine for acoustically and thermally insulating the component. The method comprises the steps of: providing a fibrous core consisting of at least one fibrous bundle that extends along a direction that is approximately parallel to a longitudinal axis; wrapping the outer surface of the fibrous core by means of a fibrous bundle that extends along a direction that is approximately transverse to the bundle of the fibrous core, thus providing at least one outer tubular fibrous containment sleeve that extends, in turn, along the longitudinal axis and covers the outer surface of the fibrous core to trap the fibrous core therein.

15 Claims, 6 Drawing Sheets

(51) Int. Cl.
*F01N 1/24* (2006.01)
*D04H 3/018* (2012.01)
*F01N 3/28* (2006.01)
*D04H 3/077* (2012.01)
*D04H 3/07* (2012.01)
*D04H 3/005* (2012.01)
*D04H 3/00* (2012.01)

(52) U.S. Cl.
CPC ............... *D04H 3/018* (2013.01); *D04H 3/07* (2013.01); *D04H 3/077* (2013.01); *F01N 1/24* (2013.01); *F01N 3/2853* (2013.01); *F01N 2310/02* (2013.01); *F01N 2310/04* (2013.01); *Y02A 50/20* (2018.01)

(58) Field of Classification Search
CPC ...... F01N 3/2853; F01N 1/24; F01N 2310/02; F01N 2310/04; Y02A 50/20
USPC .................................................. 428/377, 222
See application file for complete search history.

(56) References Cited

U.S. PATENT DOCUMENTS

| | | | |
|---|---|---|---|
| 2005/0001012 A1* | 1/2005 | Brandt | .................. D04H 3/073 |
| | | | 228/101 |
| 2013/0146392 A1* | 6/2013 | Bowie | .................. E04B 1/8409 |
| | | | 181/286 |
| 2014/0251720 A1 | 9/2014 | Daniszewski | |

* cited by examiner

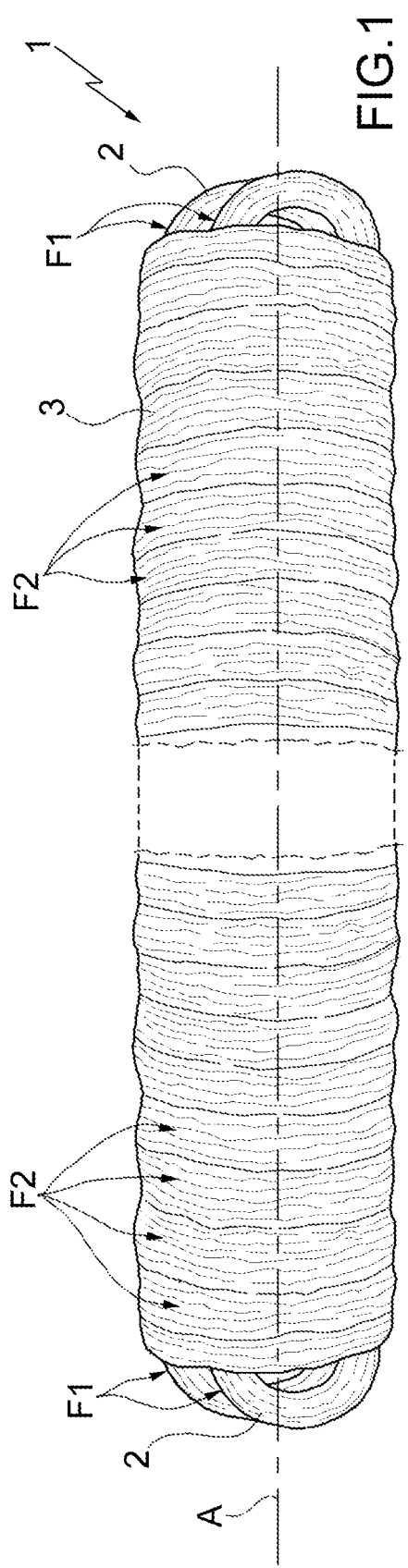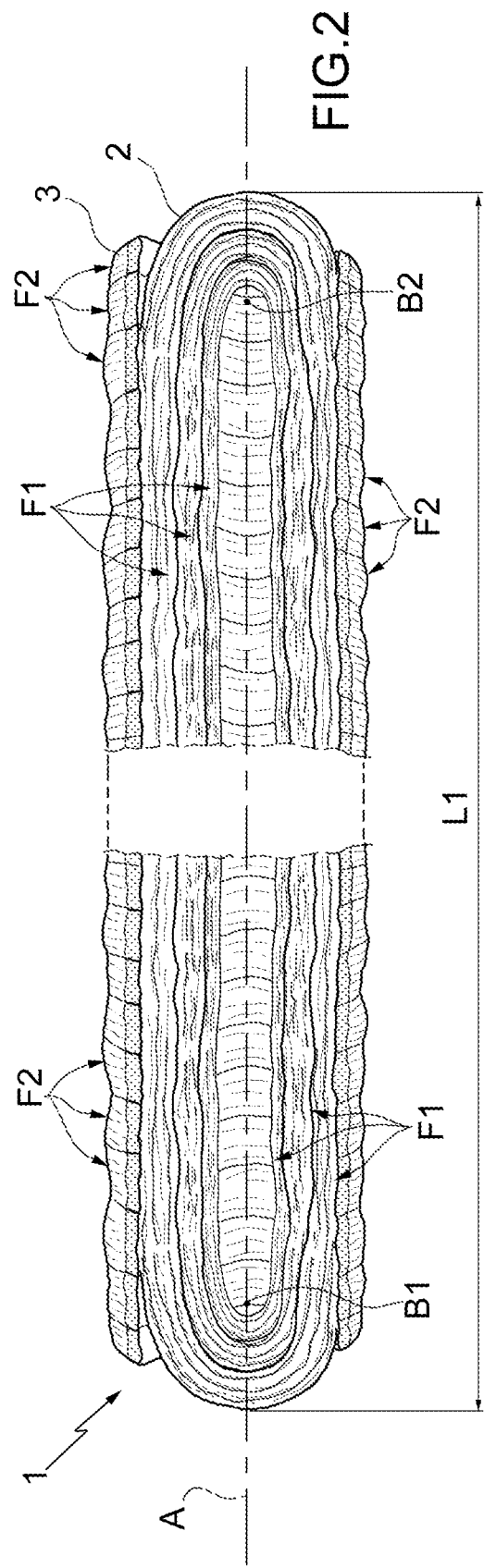

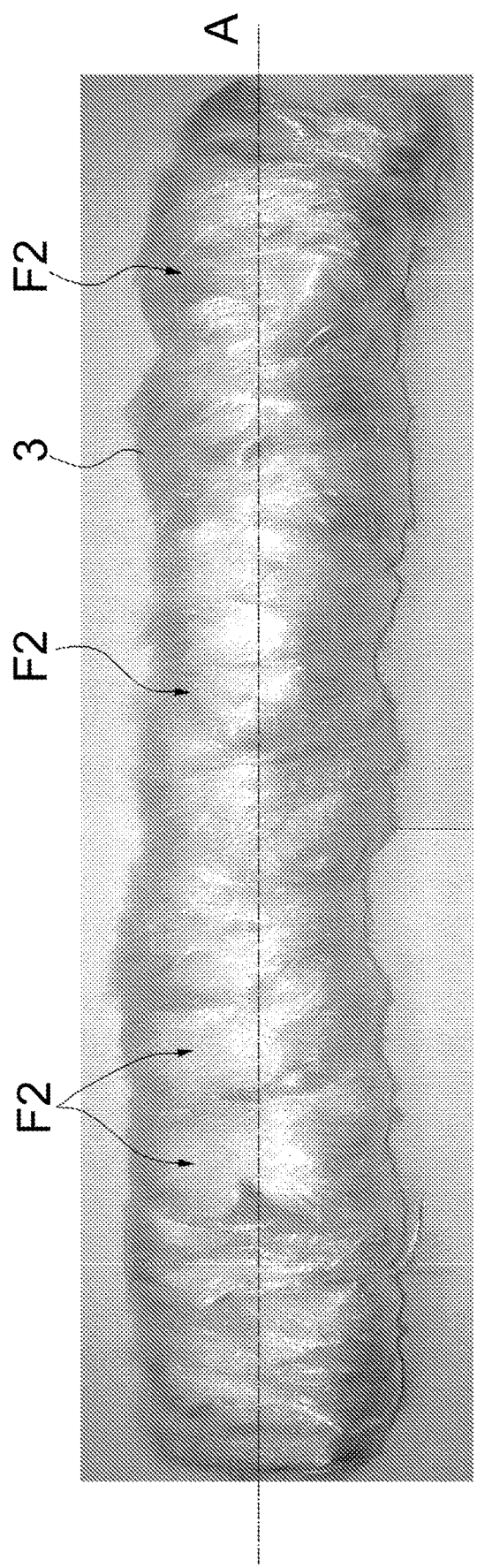
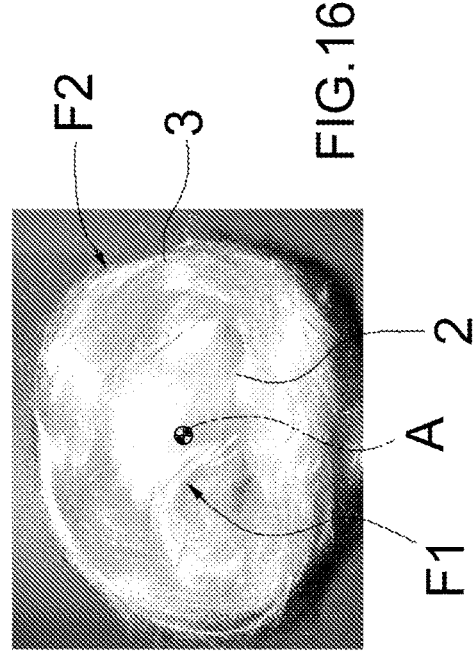
FIG.15
FIG.16

METHOD FOR PRODUCING A FIBROUS MAT FOR THE ACOUSTIC AND/OR THERMAL INSULATION OF A COMPONENT OF A MOTOR VEHICLE

CROSS-REFERENCE TO RELATED APPLICATIONS

This application is a U.S. national stage of International Application No. PCT/IB2017/051545, filed Mar. 16, 2017, which claims the benefit of and priority to Italian Patent Application No. 102016000027681, filed Mar. 7, 2016, Italian Patent Application No. 102016000027681, filed Mar. 16, 2016, each of which are hereby incorporated by reference herein in its entirety.

TECHNICAL FIELD

The present invention relates to a method for producing a fibrous mat designed to be inserted/fitted in a component of a vehicle provided with an internal combustion engine for acoustically and/or thermally insulating the component.

In particular, the present invention relates to a method for producing a soundproofing and/or heat-insulating flexible fibrous mat which can be installed in a component of an internal combustion engine and/or in an exhaust system of a vehicle such as a motor vehicle, a motorcycle or the like; to which the following description will make explicit reference without thereby losing its generality.

BACKGROUND ART

As already known, the silencers of the exhaust systems of motor vehicles define a portion of the exhaust system where the noise produced by the pressure waves of the exhaust gases emitted by the engine is attenuated. The silencer typically comprises an outer metal shell or casing, one or more metal ducts and/or diaphragms arranged inside the casing and traversed, in use, by the exhaust gases and a preform made of soundproofing material, which is generally fitted in the ducts inside the chamber to attenuate the noise transmission.

The preform generally comprises an inner fibrous core consisting of a skein of resinated fibres, i.e. impregnated with thermo-fixed consolidating resins and/or amalgams to be joined/compacted together to give the fibrous core the high consistency required to prevent the fibres from flaking during the insertion/fitting of the preform in the duct to be insulated. The use of consolidating resins and amalgams to stiffen the fibres composing the preform is however disadvantageous, since in use they are decomposed and fragmented due to the high temperatures of the exhaust gases in the silencer and are therefore subject to be expelled out of the exhaust system, with undesirable consequences from the point of view of environmental pollution. In particular, the decomposition/fragmentation of the resins/amalgams causes, on the one hand, a progressive disintegration and weakening of the fibres that deteriorates the soundproofing capacity of the preform, and on the other hand, the expulsion of the fibres from the silencer.

DISCLOSURE OF INVENTION

The Applicant has carried out a thorough study whose aim was finding a solution to achieve the object of simply and inexpensively producing a soundproofing and/or heat-insulating mat which, on the one hand, is free of consolidating amalgams and/or resins, thus not requiring any thermosetting of the same, and on the other hand is fully made of fibres.

This object is achieved by the present invention in that it relates to a method for producing a fibrous mat which can be installed in a component of a vehicle provided with an internal combustion engine for acoustically and/or thermally insulating the component; the method comprises the steps of: a) providing a fibrous core consisting of at least one fibrous bundle, which at least partially extends along a direction that is approximately parallel to a longitudinal axis; b) wrapping said fibrous core by means of at least one fibrous bundle thus forming or more coils which extend transverse to said bundle of said fibrous core so as to retain said at least one fibrous bundle of said fibrous core.

Preferably, said step b) comprises the step of wrapping the outer surface of said fibrous core by means of at least one fibrous bundle thus providing at least one outer tubular fibrous containment sleeve that extends, in turn, along said longitudinal axis and at least partially covers said outer surface of the fibrous core to trap it therein.

Preferably, the method comprises the step of winding said fibrous bundle around at least an axis that is approximately perpendicular to said longitudinal axis.

Preferably, the method includes the step of rotating said fibrous core about said longitudinal axis; and during said rotation, of wrapping said fibrous core by means of a fibrous bundle following a helical trajectory, thus keeping a portion of the fibrous bundle taut along a direction approximately transverse to said longitudinal axis.

Preferably, the method comprises the step of winding said fibrous core and the step of maintaining said fibrous core axially fixed along said longitudinal axis and winding/moving the fibrous bundle around said fibrous core along a helical trajectory coaxial with said longitudinal axis, thus externally covering the fibrous core.

Preferably, the method comprises the step of winding said fibrous bundle around two axes which are perpendicular to said longitudinal axis and are mutually spaced at a distance approximately equal to the length of said fibrous mat thus forming an elongated wound skein which extends along said longitudinal axis; rotating said fibrous core around said longitudinal axis and during said rotation, wrapping said fibrous core by means of a fibrous bundle following a helical trajectory while keeping the fibrous bundle taut along a direction approximately transverse to said longitudinal axis.

Preferably, the method comprises the step of arranging at least two hooking members at a mutual distance approximately equal to the length of said fibrous mat and winding the fibrous bundle between said hooking members thus forming one or more portions of the fibrous bundle extending along directions approximately parallel to said longitudinal axis so as to form said fibrous core; rotating said hooking members about the longitudinal axis thus rotating said fibrous core about said longitudinal axis; and during said rotation, helically wrapping said fibrous core by means of a fibrous bundle keeping it taut along a direction substantially transverse to said longitudinal axis.

Preferably, the method comprises the step of providing a tubular shaft which extends along said longitudinal axis, can rotate about said longitudinal axis and has at least two hooking members at the two opposite distal ends; winding a fibrous bundle around said hooking members so as to form at least an elongated skein, which has relative major branches parallel to said longitudinal axis; rotating said tubular shaft; winding a fibrous bundle around said shaft during said rotation, keeping said fibrous bundle taut along a direction approximately transverse to said longitudinal axis and advancing at the same time the fibrous bundle in at least one direction parallel to said longitudinal axis between the opposite ends of the tubular shaft so as to cover the outer surface of said fibrous core.

The present invention also relates to a soundproofing and/or heat-insulating fibrous mat designed for being installed in a component of a motor vehicle; said fibrous mat being characterized in that it comprises: a fibrous core comprising one or more fibrous bundles, which extend along directions approximately parallel to a longitudinal axis; and an outer tubular fibrous containment sleeve extending along said longitudinal axis and comprising one or more fibrous bundles extending, in turn, approximately transverse to the fibres of said fibrous core and covering said outer surface of the fibrous core to trap it therein. Preferably, the fibrous core and/or said tubular fibrous layer are exclusively composed of continuous fibres.

Preferably, the fibrous core and/or said tubular fibrous layer are exclusively composed of mineral fibres. Preferably, the fibrous core and/or said tubular fibrous layer comprise bulking and/or textured fibres.

Preferably, the fibrous core and/or said tubular fibrous layer are exclusively composed of glass fibres and/or basalt fibres and/or silica fibres.

Preferably, the fibrous core and/or said tubular fibrous layer are exclusively composed of fibres of a synthetic material based on polystyrene and/or polypropylene and/or polyamides and/or Kevlar and/or carbon and/or aramid and/or cotton.

Preferably, the fibrous core and/or said tubular fibrous layer are exclusively composed of metal fibres.

Preferably, the fibrous core and/or said tubular fibrous layer are exclusively composed of steel fibres.

Preferably, the fibrous core and/or said tubular fibrous layer are exclusively composed of metallic fibres having a thickness comprised between about 6 and 400 microns.

Preferably, the fibrous mat is used/comprised in a heat shield.

Preferably, the fibrous mat is used/comprised in an exhaust system of a motor vehicle.

BRIEF DESCRIPTION OF THE DRAWINGS

The present invention will now be described with reference to the accompanying drawings showing a non-limiting embodiment, wherein:

FIG. 1 is a schematic perspective view of a soundproofing and/or heat-insulating fibrous mat made in accordance with the teaching of the present invention;

FIG. 2 is a partially sectional view, with parts removed for clarity's sake, of the fibrous mat shown in FIG. 1;

Figure 17:
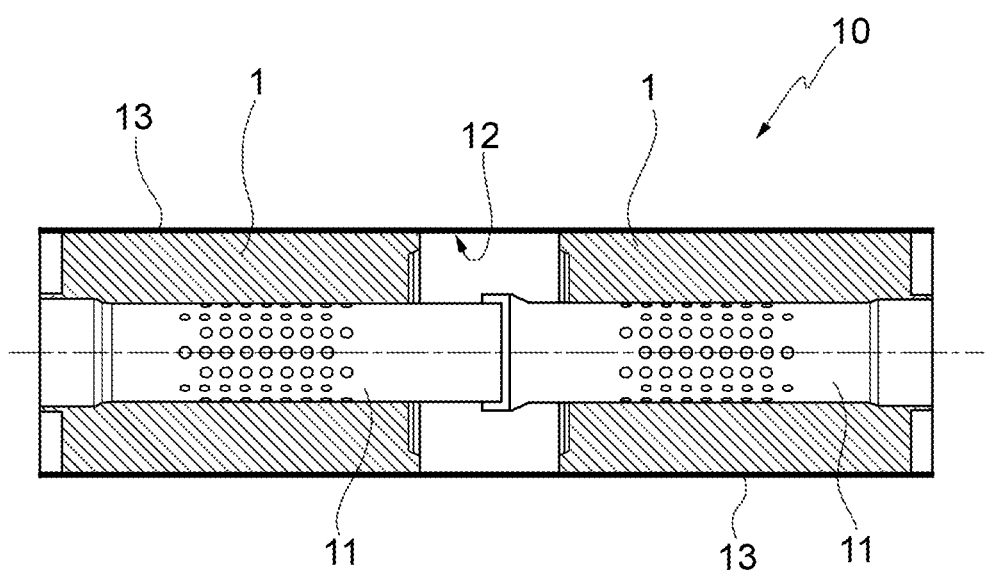

Picture 15 shows a front view of a mat according to the present invention;

Picture 16 shows a side view of the fibrous mat shown in picture 15; whereas FIG. 17 schematically shows a longitudinal section of a portion of an exhaust gas system of an internal combustion engine of a vehicle comprising a silencer equipped with the fibrous mat shown in FIG. 1.

BEST MODE FOR CARRYING OUT THE INVENTION

The present invention will now be described in detail with reference to the accompanying drawings to allow a person skilled in the art to carry it out and use it. Various modifications to the described embodiments will be readily apparent to those skilled in the art, and the described general principles might be applied to other embodiments and applications without departing from the protective scope of the present invention as defined in the appended claims. Therefore, the present invention should not be regarded as limited to the embodiments here described and shown, but should be given the widest possible scope consistent with the principles and characteristics here described and claimed.

With reference to FIGS. 1 and 2 and to the pictures 15 and 16, the reference number 1 denotes in its entirety a fibrous skein or fibrous mat, which is designed for acoustically and/or thermally insulating a component of a vehicle provided with an internal combustion engine.

The fibrous skein or mat 1 object of the present invention is essentially composed of fibres wound in coils in the way described in detail hereinafter, and is free of resins and/or amalgams or the like that in the state of the art are generally used to fasten/embed the fibres to obtain a rigid/compact preform.

The fibres of the mat 1 are wound in coils to form as a whole a soft mattress that extends along a longitudinal axis A and has a preferably approximately circular/elliptical section transverse to the axis A. Unlike known preforms/inserts (made with fibres embedded in the resins), the thus obtained mat 1, on the one hand, is flexible and extremely "soft" to the touch, thus conveniently fitting in the inner space of the component in which it is installed, and on the other hand shows a sufficient compactness to keep its shape without collapsing/flattening on itself.

In the present description, the term "component" includes any element/part of the vehicle that has a substantially circular/elliptical cross section, and preferably an approximately cylindrical three-dimensional shape or the like, on which the fibrous mat 1 can be fitted to obtain a thermal and/or acoustic insulation. For example the component could be included in the silencer 10 (shown in FIG. 17) or in the exhaust system or in the engine or in the engine compartment or in the tank or in a heat shield. FIG. 17 shows a silencer 10 provided with a pair of mats 1 wound around a central common duct 11 arranged in a chamber 12 delimited by an outer shell 13.

According to the embodiment shown in FIGS. 1, 2 and 17, the fibrous mat 1 is designed to be wrapped around, or fitted/inserted in associated pipes, tubular perforated partitions, exhaust ducts/channels passing through a chamber of a silencer 10 of an exhaust gas system of an internal combustion engine of a vehicle to attenuate the noise/heat associated with the gas passing through it, or in the insulating chamber of a heat shield.

According to a preferred embodiment shown in FIGS. 1 and 2, the fibrous mat 1 comprises a central fibrous core 2 comprising one or more fibrous bundles F1, which extend along directions approximately parallel to the longitudinal axis A, and a tubular layer i.e. an outer tubular fibrous containment sleeve 3 wound around the longitudinal axis A covering the outer surface of the fibrous core 1 so as to trap it therein.

According to a preferred embodiment shown in FIGS. 1 and 2, the central fibrous core 2 may comprise a fibrous bundle F1 repeatedly wound around at least an axis approximately transverse to said longitudinal axis A forming a skein of fibres, whereas the outer tubular fibrous containment sleeve 3 extends along the longitudinal axis A and is formed by at least a fibrous bundle F2 wound around the outer surface of the fibrous core 2 according to an approximately helical/spiral trajectory/path.

According to an exemplary embodiment shown in FIG. 2, the fibrous bundle F1 can be repeatedly wound around at least two axes B1 and B2, which are approximately perpendicular to the longitudinal axis and are mutually spaced by a distance preferably smaller than or equal to the length L1 of the fibrous mat 1. The axes B1 and B2 can be preferably, but not necessarily, approximately parallel to each other, whereas the skein formed/constituted by the wound fibres F1 has a predominantly elongated shape along the axis A. In the example shown in FIG. 2, the skein of fibres F1 has two opposite longitudinal ends wound around two axes B1 and B2 and has mutually adjacent major extending branches, which remain approximately parallel to the longitudinal axis A.

With regard to the helically developed fibrous bundle F2 forming the outer tubular fibrous containment sleeve 3, as shown in FIG. 2 it is approximately transverse to the fibrous bundle F1 of the fibrous core.

The Applicant has found that by winding the fibres F1 that form the fibrous core 2 and extend along the axis A through the fibres F2, whose helical development is approximately transverse to the fibres F1, an extremely compact self-supporting containment structure of the fibrous core 2 is advantageously obtained.

According to an exemplary embodiment shown in FIGS. 1 and 2, the outer tubular fibrous containment sleeve 3 formed by the fibres F2 wound around the longitudinal axis A forms a tubular body substantially corresponding to a fibrous sleeve.

According to an exemplary embodiment shown in FIGS. 1 and 2, the outer tubular fibrous containment sleeve 3 extends along the axis A wrapping continuously the underlying fibrous core 2 to completely coat/cover its outer surface.

Figure 11:
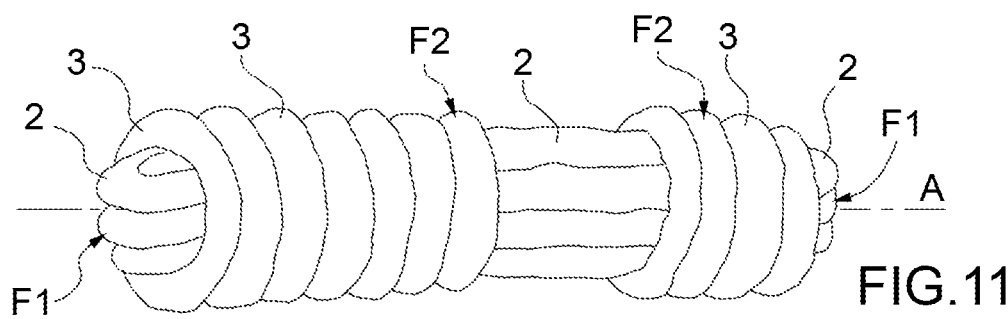
FIGS. 11-14 show examples of possible shapes of the fibrous mat achievable through the method provided by the present invention.

However, the present invention is not limited to an outer tubular fibrous containment sleeve 3 which continuously extends along the longitudinal axis A between the opposite ends of the fibrous core 2, but according to a first variant shown in FIG. 11, the outer tubular fibrous containment sleeve 3 may be discontinuous, thus leaving some uncovered outer portions of the fibrous core 2. For example, the outer tubular fibrous containment sleeve 3 can be divided in separate portions wrapping corresponding portions of the fibrous core 2. Preferably, the two portions of the outer tubular fibrous containment sleeve 3 may be arranged so that they wrap the opposite longitudinal ends of the fibrous core 2 (FIG. 11).

Figure 12:
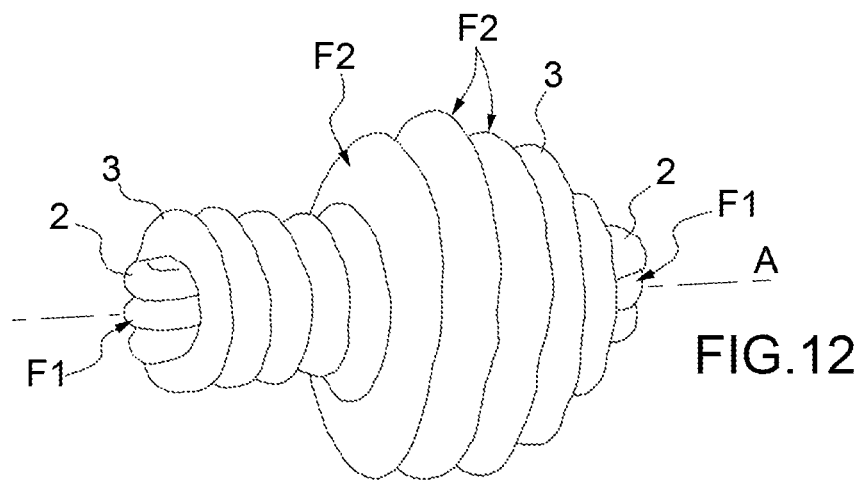
Figure 13:
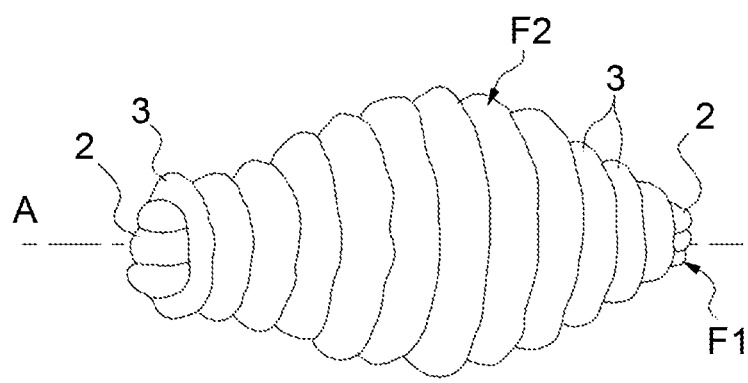
Figure 14:
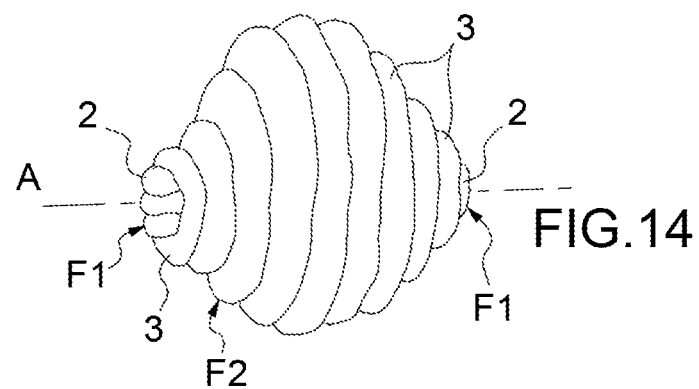

According to an exemplary embodiment shown in the FIGS. 12-14, the outer diameter of the outer tubular fibrous containment sleeve 3 along the axis A can be approximately constant or can vary in a predetermined range of about 1-40 cm so that the mat 1 has an approximately cylindrical shape. However, the present invention is not limited to a cylindrical mat 1 having a single diameter, but can be provided with a cylindrical mat 1 with more cylindrical portions with different diameters, or having an approximately elliptical shape, or an approximately truncated conical shape and/or an approximately spherical shape (FIGS. 12, 13 and 14). For instance, shape and size of the mat 1 can change based on the shape of the component, preferably the duct on which the mat 1 is fitted, and/or the inner shape of the chamber housing it.

The fibres of the bundles F1 and F2 respectively forming the fibrous core 2 and the outer tubular fibrous containment sleeve 3 preferably comprise continuous mineral fibres.

In the present description, the term continuous fibre means a fibre having such a length to provide a plurality of coils of the mat 1. For purely descriptive but not limitative purposes, a continuous fibre may preferably have a length greater than approximately 30 cm.

Preferably, the fibres of the bundles F1 and F2 can be bulked and/or textured. The fibres of the bundles F1 and F2 may comprise any type of mineral fibre that can attenuate the noise/heat transmission due to the exhaust gas passing through the ducts. Preferably, the fibres of the bundles F1 and F2 may comprise e.g. glass fibres, basalt fibres, silica or any other type of similar mineral fibre having soundproofing and/or heat-insulating properties and preferably installable in a silencer 10.

According to a different embodiment, the fibres of the bundles F1 and F2 can conveniently comprise fibres of a synthetic material based on polystyrene and/or polypropylene and/or polyamides and/or Kevlar and/or carbon and/or aramid and/or cotton and/or any other type of similar synthetic material.

According to a different embodiment, the fibres of the bundles F1 and F2 may conveniently comprise fibres in metallic material, preferably steel, for example stainless steel. Preferably, the fibres in metallic material may have a thickness comprised between about 6 and 400 microns. The tubular element 1 may comprise one or more types of fibres of the aforesaid type.

With reference to FIGS. 3-10, the operating steps of the method for producing the fibrous mat 1 according to the present invention will be described below and schematically represented.

Figure 3:
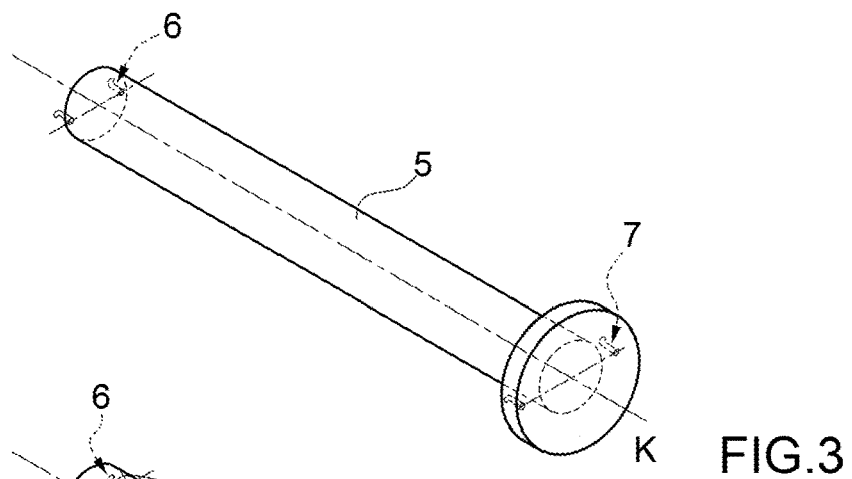
FIGS. 3-10 are schematic perspective views showing the operating steps of the method for producing the fibrous mat shown in FIG. 1, provided according to the present invention.

With reference to the example shown in FIG. 3, the method provides an elongated support element, which extends along a longitudinal axis K.

According to a possible preferred embodiment shown in the FIGS. 3-9, the support element may comprise a shaft 5, which extends along the longitudinal axis K and can preferably rotate around the longitudinal axis K.

The shaft 5 has, preferably at its opposite distal ends, hooking members 6 and 7 provided to keep the bundle F1 hooked to the ends of the shaft 5.

Figure 4:
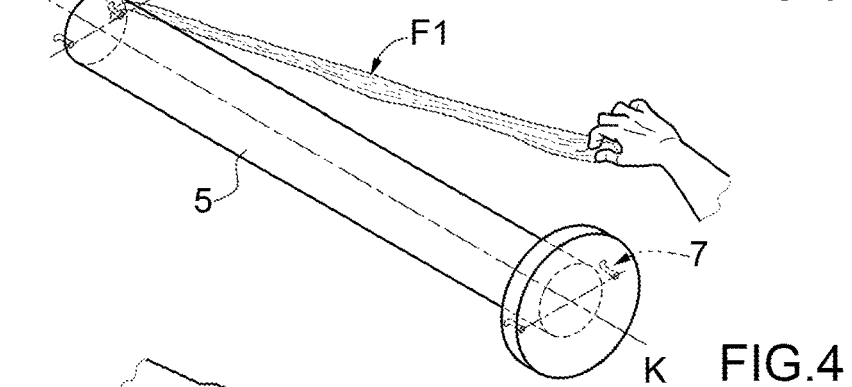

According to a possible preferred exemplary embodiment shown in FIG. 4, the shaft 5 comprises a metal drum or elongated tubular element connected to a rotating drive unit, e.g. the shaft of an electric motor (not shown) to be rotated about the axis K, while the hooking members 6 and 7 may comprise, for example, straight or curved rods projecting from the outer surface of the metal tubular element. The cross section of the shaft 5 may be circular or elliptical, square, rectangular or the like, based on the cross section of the mat 1 to be produced.

Figure 5:
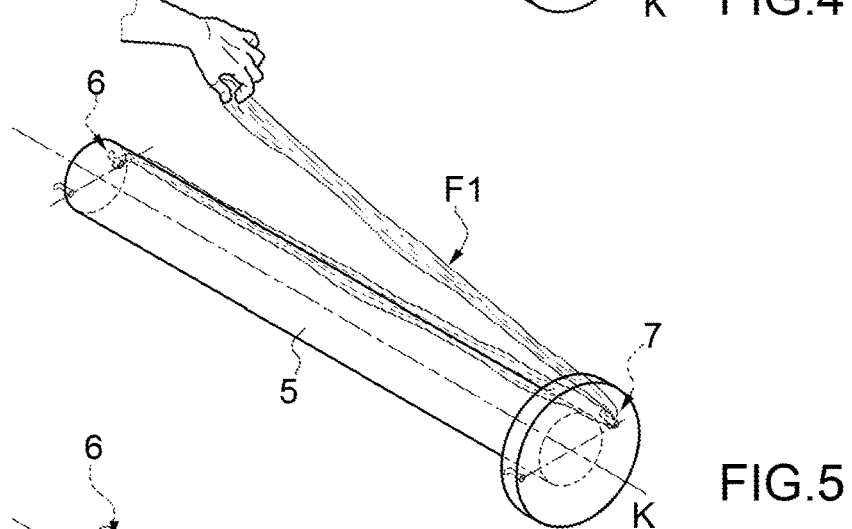

With reference to FIGS. 4 and 5, the method comprises the step of winding the fibrous bundle F1 around the hooking members 6 and 7 at the ends of the shaft 5 in order to form the above-mentioned elongated skein (destined to form the fibrous core 2) along the longitudinal axis A corresponding to the longitudinal axis K of the shaft 5. In the shown example, the shaft 5 is angularly fixed (non-rotating), while the fibrous bundle F1 is repeatedly wound around the hooking members 6 and 7 to form the major fibrous branches of the aforesaid skein that extend along the shaft 5 and are substantially kept taut by the hooking members 6 and 7, preferably resting on the outer face of the shaft 5. The winding of the fibrous bundle F1, which determines the number of major branches of the skein along the shaft 5, varies based on the size/thickness/texture/density of the fibrous core 2 to be obtained.

Figure 6:
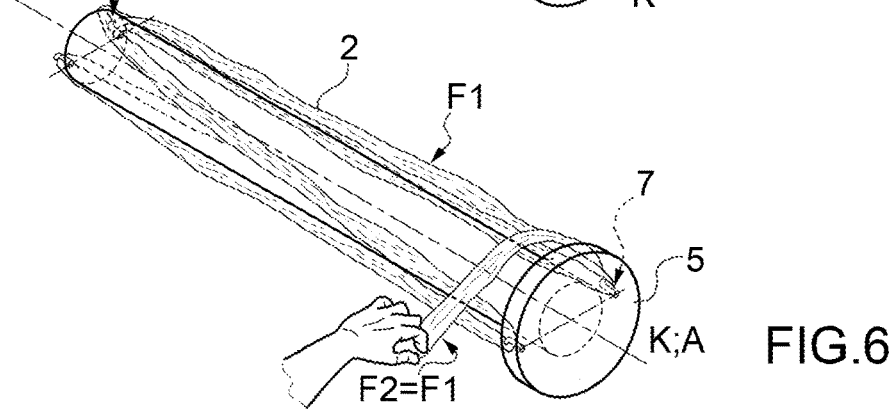
Figure 7:
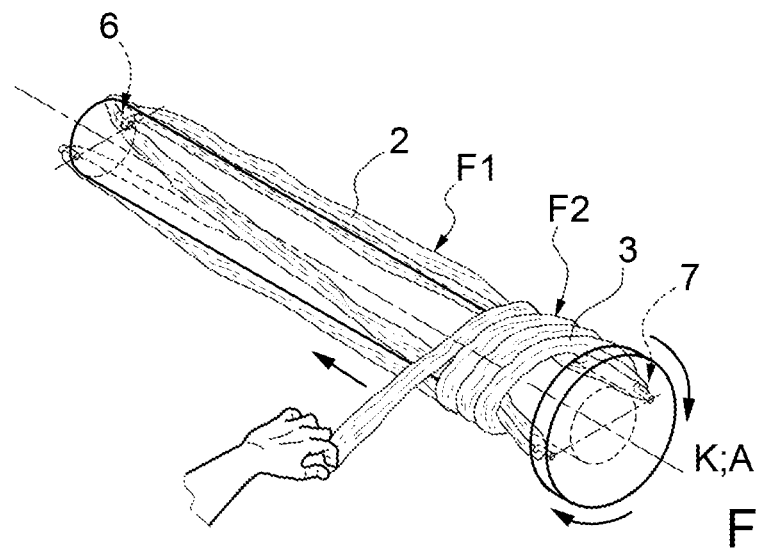

With reference to FIG. 6, the method further comprises the step of attaching one end of the bundle F2 to the shaft 5, for example to a hooking member 6, keeping taut the bundle F2 along a direction substantially transverse/inclined with respect to the longitudinal axis K (corresponding to the axis A) and rotating the shaft 5 around the axis K so that the bundle F2 is helically wrapped around the major branches of the inner skein forming the fibrous core 2.

In particular, this step provides for winding the fibrous core 2 through the fibrous bundle F2 to create one or more coils transversely extending to the bundle F1 of the fibrous core 2, namely surrounding the fibrous core 2, to retain/tighten the fibrous bundle F1 of the fibrous core 2.

According to a possible embodiment, the fibrous bundles F1 and F2 rather than being separated can be mutually connected at the relative ends or may be part of the same bundle. In other words, the fibrous bundle F2 may correspond to the fibrous bundle F1 as shown in the example of FIG. 6.

During the rotation of the shaft 5, the fibrous bundle F2 is preferably kept taut and is advanced on the outer surface of the fibrous core 2 along a first direction between a first end of the shaft 5 toward a second end to create a helical wrapping externally covering the fibrous core 2 (FIG. 7), and/or can be advanced on the outer surface of the first coil 2 along a second direction opposite the first, between the second end of the shaft 5 toward the first end so as to create a second helical wrapping. The above mentioned wrapping operations can be repeated several times and may vary based on the size/thickness/texture/density of the fibrous core 2 to be obtained. In other words, the sleeve 3 may comprise a number of superimposed and crossed coils.

According to a possible embodiment, the method may discontinuously create the coils of the bundle F2 to produce the portions of the aforesaid outer tubular layer (shown in FIG. 11). In this case, it is possible to alternate the rotation to the fixing of the end portions of the bundle F2 in different variable hooking points of the shaft 5 based on the number of tubular containment portions to be produced.

Figure 8:
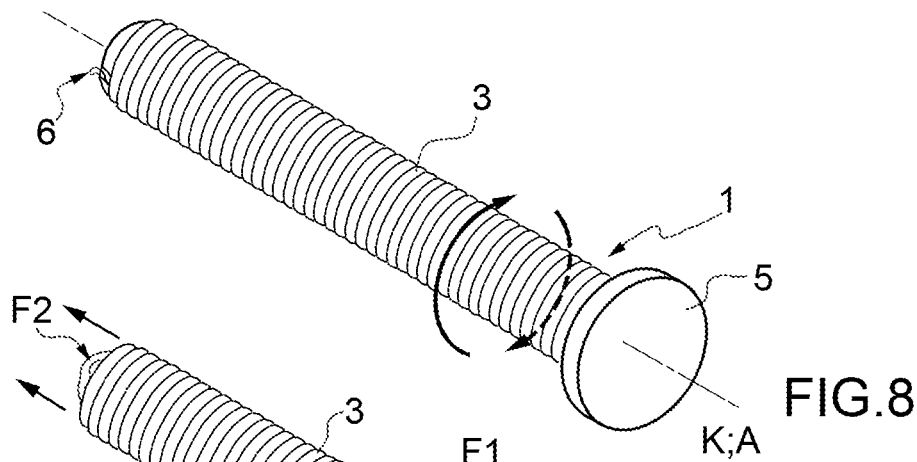
Figure 9:
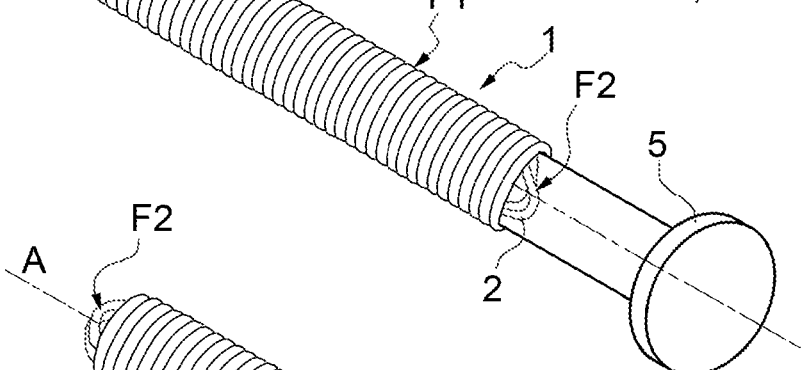
Figure 10:
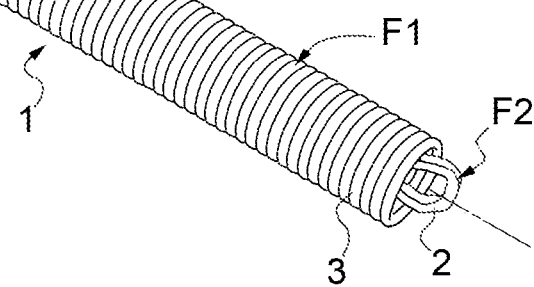

With reference to FIGS. 8, 9 and 10, the method finally comprises the step of removing the mat 1 from the shaft 5. Since the outer winding of the bundle F2 is carried out by keeping the taut bundle F2 wrapped on the core 2, when the mat 1 is removed from the shaft 5 the fibrous core 2 tends to elastically expand, thus filling the inner space of the sleeve 3 and being simultaneously trapped by it.

Then the fibrous mat 1 is wrapped around, or inserted/fitted in the duct of the silencer 10 (shown in FIG. 17) or in heat shield (not shown).

It has therefore been demonstrated that the present invention allows reaching the aforesaid objectives.

The invention claimed is:

1. A method for producing a fibrous mat which is without resin, amalgam, or both and is designed to be installed in a silencer of an exhaust gas system of an internal combustion engine of a vehicle to attenuate noise and heat associated with exhaust gas passing through the exhaust gas system, said fibrous mat is designed to be wrapped around or fitted in associated pipes, tubular perforated partitions, exhaust ducts passing through a chamber of the silencer, the method comprising:

providing a fibrous core by winding a first fibrous bundle around two axes that are perpendicular to a longitudinal axis and are mutually spaced at a distance approximately equal to the length of the fibrous mat so as to form an elongated wound skein that extends along the longitudinal axis; and wrapping an outer surface of the fibrous core with a second fibrous bundle to form an outer tubular fibrous containment sleeve that extends along the longitudinal axis to internally retain the first fibrous bundle and trap the fibrous core within the outer tubular fibrous containment sleeve;

wherein the fibrous core and the outer tubular fibrous containment sleeve comprise mineral fibers which attenuate the noise and heat transmission due to exhaust gas passing through the exhaust duct, and an inner space of the outer tubular fibrous containment sleeve is filled by the fibrous core, the fibrous core being simultaneously trapped by the outer tubular fibrous containment sleeve;

wherein the first fibrous bundle corresponds to the second fibrous bundle.

2. The method according to claim 1, wherein the wrapping the fibrous core includes rotating the fibrous core around the longitudinal axis and during the rotation, wrapping the fibrous core with the at least one second fibrous bundle according to a helical trajectory keeping a portion of the at least one second fibrous bundle taut along a direction approximately transverse to the longitudinal axis.

3. The method according to claim 1, wherein the maintaining the fibrous core angularly fixed around the longitudinal axis and wrapping the at least one second fibrous bundle around the fibrous core along a helical trajectory coaxial to the longitudinal axis to cover the fibrous core.

4. The method according to claim 1, wherein:

the providing includes mutually spacing at least two hooking members at a distance approximately equal to the length of the fibrous mat and winding the at least one first fibrous bundle between the hooking members, thus forming one or more portions of the at least one first fibrous bundle that extend along directions approximately parallel to the longitudinal axis to form the fibrous core; and the wrapping includes rotating the hooking members around the longitudinal axis to rotate the fibrous core around the longitudinal axis and during the rotation, helically wrapping the fibrous core with the at least second fibrous bundle keeping the fibrous core taut along a direction substantially transverse to the longitudinal axis.

5. The method according to claim 1, wherein:

the providing includes providing a tubular shaft that extends along the longitudinal axis and is designed to rotate around the longitudinal axis, the tubular shaft having a first distal end and a second distal end opposite the first distal end, the first distal end having a first pair of hooking members and the second distal end having a second pair of hooking members and winding the first fibrous bundle around the first pair of hooking members and the second pair of hooking members so as to form the elongated wound skein; and the wrapping includes rotating the tubular shaft around the longitudinal axis to wind the second fibrous bundle around the tubular shaft during the rotation, keeping the second fibrous bundle taut along a direction approximately transverse to the longitudinal axis and simultaneously moving the second fibrous bundle in at least one direction parallel to the axis between the distal ends of the tubular shaft so as to cover the outer surface of the fibrous core.

6. A soundproofing and heat-insulating fibrous mat which is free of one or both of resins and amalgams and is designed to be installed in a silencer of an exhaust gas system of an internal combustion engine of a vehicle to attenuate noise and heat associated with exhaust gas passing through the exhaust gas system, the fibrous mat is designed to be wrapped around or fitted in an associated pipe or exhaust duct passing through a chamber of the silencer, the fibrous mat comprising:
- a fibrous core including a first fibrous bundle, which at least partially extends along a direction approximately parallel to a longitudinal axis; and
- a second fibrous bundle wrapped around an outer surface of the fibrous core so as to form an outer tubular fibrous containment sleeve that extends along the longitudinal axis to internally retain and trap the fibrous core within the outer tubular fibrous containment sleeve;
- wherein the first fibrous bundle is wound around two axes that are perpendicular to the longitudinal axis and are mutually spaced at a distance approximately equal to the length of the fibrous mat to form an elongated wound skein that extends along the longitudinal axis, wherein the fibrous core and the outer tubular fibrous containment sleeve comprise mineral fibres which attenuate the noise and heat transmission due to the exhaust gas passing through the ducts, and
- wherein the first fibrous bundle corresponds to the second fibrous bundle.

7. The mat according to claim 6, wherein the one or more coils wrap the fibrous core thus forming an outer tubular fibrous containment sleeve that extends along the longitudinal axis and at least partially covers the outer surface of the fibrous core so as to trap the fibrous core therein.

8. The mat according to claim 6, wherein the fibrous mat is of resins, amalgams, or both.

9. The mat according to claim 7, wherein the fibrous core the tubular containment sleeve include bulking fibres, textured fibres, or both.

10. The mat according to claim 7, wherein the fibrous core and the tubular containment sleeve are exclusively composed of continuous fibres.

11. The method of claim 1, wherein one or both of the fibrous core and the tubular containment sleeve comprise bulked and textured fibres.

12. The mat of claim 6, wherein one or both of the fibrous core and the tubular containment sleeve comprise bulked and textured fibres.

13. The mat of claim 6, wherein one or both of the fibrous core and the tubular fibrous layer are exclusively composed of one or more of glass fibres, basalt fibres, and silica fibres.

14. The method of claim 5 further comprising:
- removing the tubular shaft from the outer tubular fibrous containment sleeve to allow the fibrous core to fill an inner space within the outer tubular fibrous containment sleeve and trap fibrous core within the inner space.

15. The method of claim 5, wherein first pair of hooking members are angularly offset from the second pair of hooking members about the longitudinal axis.

* * * * *